US012015219B2

(12) United States Patent
Ji et al.

(10) Patent No.: US 12,015,219 B2
(45) Date of Patent: Jun. 18, 2024

(54) ELECTRICAL CONNECTOR

(71) Applicant: Tyco Electronics (Shanghai) Co., Ltd., Shanghai (CN)

(72) Inventors: Xinquan (Jone) Ji, Shanghai (CN); Wenke He, Shanghai (CN); Tommy Qian, Shanghai (CN); Zhanglan (Helen) Xue, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 149 days.

(21) Appl. No.: 17/690,795

(22) Filed: Mar. 9, 2022

(65) Prior Publication Data

US 2022/0294146 A1 Sep. 15, 2022

(30) Foreign Application Priority Data

Mar. 10, 2021 (CN) ......................... 202120512753.6

(51) Int. Cl.
*H01R 13/24* (2006.01)

(52) U.S. Cl.
CPC ................................ *H01R 13/2421* (2013.01)

(58) Field of Classification Search
CPC .................................................. H01R 13/2428
See application file for complete search history.

(56) References Cited

U.S. PATENT DOCUMENTS 4,773,877 A * 9/1988 Kruger ............... H01R 13/2428 324/755.05
7,556,503 B2 * 7/2009 Vinther .............. H01R 12/7082 439/515
7,559,769 B2 * 7/2009 Hsiao ................... H05K 7/1069 439/700
7,928,751 B2 * 4/2011 Hsu .................... G01R 1/06716 29/622
11,437,747 B2 * 9/2022 Tziviskos .............. H01R 13/17
2005/0064766 A1 * 3/2005 Zhang ................ H01R 13/6275 439/700
2010/0087072 A1 * 4/2010 Neidich ............. H01R 13/2428 439/66
2022/0294146 A1 * 9/2022 Ji ........................... H01R 43/16

* cited by examiner

*Primary Examiner* — Neil Abrams
(74) *Attorney, Agent, or Firm* — Barley Snyder

(57) ABSTRACT

An electrical connector includes a base portion, a tail portion extending from a first side of the base portion, a serpentine portion having a first end connected to a second side of the base portion opposite to the first side, a movable head portion connected to a second end of the serpentine portion, and a housing in which an accommodation chamber is formed to accommodate the serpentine portion. The housing has a first end connected with the base portion and a second end provided with a limiting portion confining the serpentine portion within the accommodation chamber. The head portion is movable so as to pass through the limiting portion. The electrical connector is made of a single piece of metal.

20 Claims, 3 Drawing Sheets

ELECTRICAL CONNECTOR

CROSS-REFERENCE TO RELATED APPLICATIONS

This application claims the benefit of the filing date under 35 U.S.C. § 119(a)-(d) of Chinese Patent Application No. 202120512753.6, filed on Mar. 10, 2021.

FIELD OF THE INVENTION

Embodiments of the present disclosure generally relate to an electrical connector, and in particular, to a socket connector adapted to mate with a plate-type plug.

BACKGROUND

In electronic equipment, a POGO-pin type electrical connector is usually used to electrically connect a fixed electronic device with a movable electronic device. The electrical connector includes a fixed end electrically connected with the fixed electronic device, a movable end electrically connected with the movable electronic device, and a serpentine portion located between the fixed end and the movable end and electrically connected with the fixed end and the movable end. The movable end is electrically connected to the movable electronic device against an elasticity of the serpentine portion, so that the movable end can maintain the reliable electrical connection with the movable electronic device by the elasticity of the serpentine portion when the movable electronic device is moved due to a vibration, for example.

In such an electrical connector, in order to prevent undesirable displacement of the serpentine portion in a direction perpendicular to an extendable direction of the movable end, it is necessary to provide an accommodation chamber suitable for constraining the serpentine portion. Generally, the serpentine portion and a housing for forming the accommodation chamber need to be formed by two separate parts, which complicates a structure of the electrical connector and increases a manufacturing cost.

SUMMARY

An electrical connector includes a base portion, a tail portion extending from a first side of the base portion, a serpentine portion having a first end connected to a second side of the base portion opposite to the first side, a movable head portion connected to a second end of the serpentine portion, and a housing in which an accommodation chamber is formed to accommodate the serpentine portion. The housing has a first end connected with the base portion and a second end provided with a limiting portion confining the serpentine portion within the accommodation chamber. The head portion is movable so as to pass through the limiting portion. The electrical connector is made of a single piece of metal.

BRIEF DESCRIPTION OF THE DRAWINGS

The invention will now be described by way of example with reference to the accompanying Figures, of which.

DETAILED DESCRIPTION OF THE EMBODIMENTS

Figure 1:
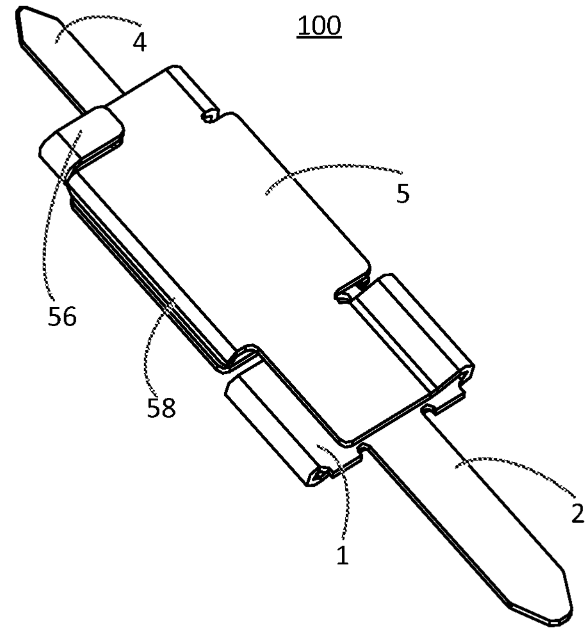
FIG. 1 is a perspective view of an electrical connector according to an embodiment.
Figure 2:
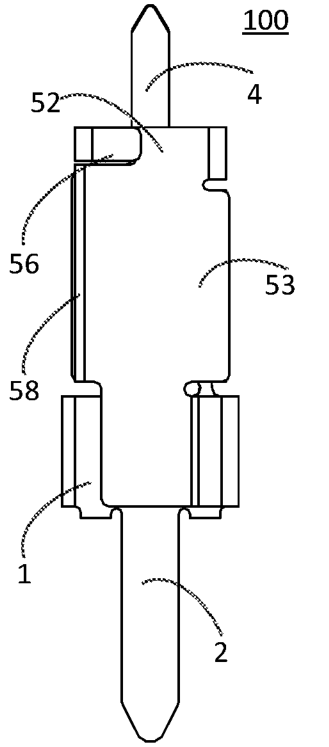
FIG. 2 is a front view of the electrical connector.
Figure 3:
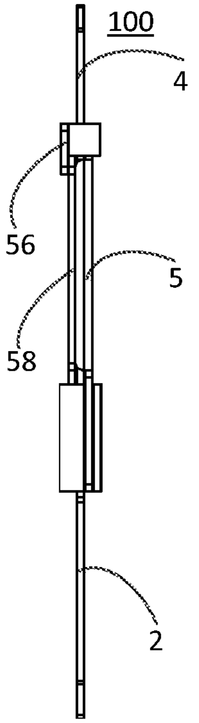
FIG. 3 is a side view of the electrical connector.

Embodiments of the present disclosure will be described hereinafter in detail taken in conjunction with the accompanying drawings. In the description, the same or similar parts are indicated by the same or similar reference numerals. The description of each of the embodiments of the present disclosure hereinafter with reference to the accompanying drawings is intended to explain the general inventive concept of the present disclosure and should not be construed as a limitation to the present disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

In an exemplary embodiment, as shown in FIGS. 1 to 4, an electrical connector 100 is made of a single piece of metal and is suitable for connecting a fixed electronic device such as a printed circuit board and a movable electronic device such as a rechargeable battery. The electrical connector 100 includes a base portion 1, an immovable tail portion 2, a serpentine portion 3, a movable head portion 4 and a housing 5. The tail portion 2 extends downwardly from a first side (a lower side in FIGS. 2-4) of the base portion 1, and may be electrically connected to an insertion hole of a circuit board, for example. In an exemplary embodiment, the electrical connector 100 may be a POGO-pin type connector and the head portion 4 is movable against an elastic force of the serpentine portion 3.

The serpentine portion 3 has a first end (a lower end in FIGS. 2-4) connected to a second side (an upper side) of the base portion 1 opposite to the first side thereof. Further, the serpentine portion 3 is formed by bending multiple times a narrow metal strip extending from the upper side of the base portion 1 so as to be capable of elastically extending and retracting in an up-and-down direction. The movable head portion 4 is connected to a second end (an upper end) of the serpentine portion 3, and for example, is adapted to be removably and electrically connected to an electrical contact of the rechargeable battery. The housing 5 is formed with an accommodation chamber 51 therein, which is suitable for accommodating the serpentine portion 3. Further, the housing 5 has a first end (a lower end in FIGS. 2-4) connected with the base portion 1, and a second end (an upper end) provided with a limiting portion 52 suitable for confining the serpentine portion 3 within the accommodation chamber 51. The head portion 4 is allowed to pass through the limiting portion 52 to move in the up-and-down direction against an elastic force of the serpentine portion 3.

In an exemplary embodiment, referring to FIGS. 1-7, the housing 5 includes two main body portions 53 respectively connected to opposite third and fourth sides of the base portion 1 perpendicular to the first side thereof. The accommodation chamber 51 is formed by bending the main body portion 53 located at the third side toward the fourth side from the third side and onto an upper surface of the base portion 1 and bending the main body portion 53 located at the fourth side toward the third side from the fourth side and onto a lower surface of the base portion 1. Therefore, the two main body portions 53 are formed as two side walls of the housing 5, which extend within a plane formed in length and width directions of the housing 5.

Figure 5:
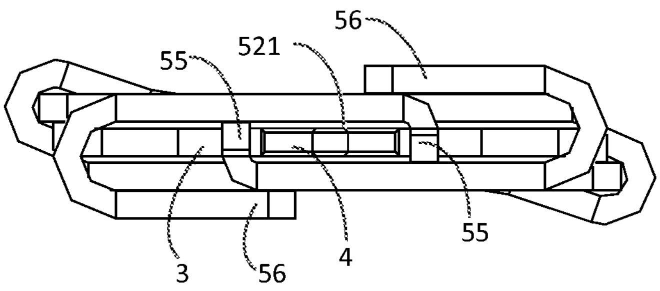
FIG. 5 is a top view of the electrical connector.
Figure 6:
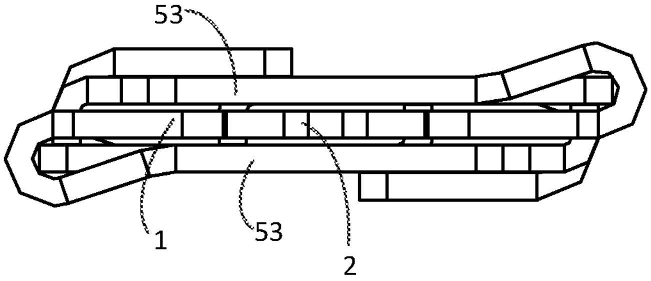
FIG. 6 is a bottom view of the electrical connector.
Figure 7:
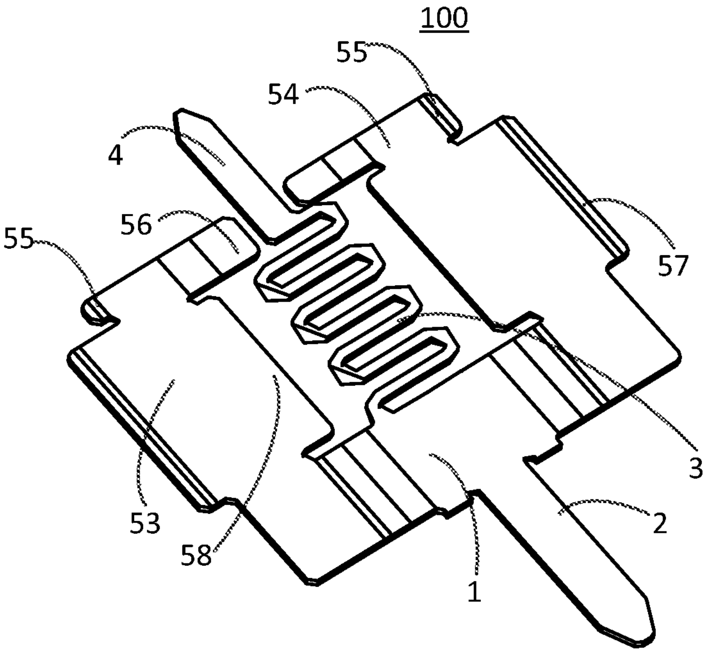
FIG. 7 is a perspective view of the electrical connector in an unfolded state.

In an exemplary embodiment, each of the main body portions 53 is provided with an extension portion 54 at an end (an upper end in FIGS. 2-3) of the main body portion 53 away from the tail portion 2, as shown in FIG. 7. Further, each of the extension portions 54 has a first support portion 55 at a side of the extension portion 54 parallel to the third side, the first support portion 55 extending substantially perpendicular to the extension portion 54. Further, the limiting portion 52 is formed with a limiting hole 521 enclosed by the two extension portions 54 and the two first support portions 55, as shown in FIG. 5. The limiting hole 521 is configured to allow the head portion 4 to movably pass therethrough, while preventing the serpentine portion 3 from entering the limiting hole 521 from the accommodation chamber 51.

In an exemplary embodiment, a bending height of each of the first support portions 55 in a thickness direction perpendicular to a moving direction of the head portion 4 (the up-and-down direction in FIGS. 2-4) is slightly greater than a thickness of the head portion 4, and a distance between the two first support portions 55 is slightly greater than a width of the head portion 4, as shown in FIG. 5. In this way, the limiting hole 521 can allow the head portion 4 to pass therethrough movably, and at the same time can prevent the head portion 4 from swinging in a direction perpendicular to the moving direction, or even from being deformed.

Figure 4:
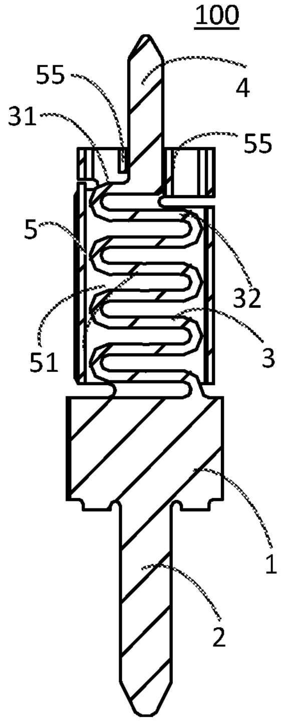
FIG. 4 is a sectional front view of the electrical connector.

In an exemplary embodiment, the two first support portions 55 have different lengths in a length direction parallel to the moving direction of the head portion 4 so as to restrict different elastic segments of the serpentine portion 3 at either side of the head portion 4, such as a first elastic segment 31 adjacent to the head portion 4 and a second elastic segment 32 located below the first elastic segment 31, respectively, shown in FIG. 4.

In an exemplary embodiment, a first holding portion 56 is provided at a side of each of the extension portions 54 opposite to the first support portion 55. Further, the first holding portion 56 of one of the two extension portions 54 has an end portion overlapped on an outer portion of the first support portion 55 of the other extension portion 54, as shown in FIG. 5. In this way, the limiting hole 521 of the limiting portion 52 can be prevented from being deformed.

In an exemplary embodiment, referring to FIGS. 1-7, a second support portion 57, which extends substantially perpendicular to each of the main body portions 53, is provided at a side of the main body portion 53 parallel to the third side. The accommodation chamber 51 is enclosed by the two main body portions 53 and the two second support portions 57.

In an exemplary embodiment, a bending height of each of the second support portions 57 in a thickness direction perpendicular to the moving direction of the head portion 4 is slightly greater than a thickness of the serpentine portion 3, and a distance between the two second support portions 57 is slightly greater than a width of the serpentine portion 3. In this way, the limiting hole 521 can allow the serpentine portion 3 to extend and retract freely in the accommodation chamber 51, and at the same time can prevent the serpentine portion 3 from swinging in a direction perpendicular to an extendable direction, or even from being deformed.

In an exemplary embodiment, a second holding portion 58 is provided at a side of each of the main body portions 53 opposite to the second support portion 57, as shown in FIG. 7. Further, the second holding portion 58 of one of the two main body portions 53 has an end portion overlapped on an outer portion of the second support portion 57 of the other main body portion. In an alternative embodiment, the second holding portion 58 may be omitted, that is, the portion indicated by reference numeral 58 in FIG. 7 is not bent.

Referring to FIG. 7, the electrical connector 100 of the embodiments of the present disclosure as described above may be manufactured from a single piece of metal sheet, such as a copper sheet, through mechanical processing including cutting, punching and bending. Firstly, an integral copper sheet is cut and punched into a shape shown in FIG. 7, and then the electrical connector 100 shown in FIG. 1 and described above is formed through the mechanical processing such as bending and folding.

According to the electrical connector 100 of the embodiments of the present disclosure as described above, the housing 5 can fully protect the serpentine portion 3 as a spring terminal. The entire electrical connector 100 is formed through an integrated sheet metal forming process. Further, an annular wall enclosed by the two main body portions 53 and the two second support portions 57 is formed around the serpentine portion 3 to protect the serpentine portion 3 and confine a movement space of the head portion 4 and the serpentine portion 3, so as to realize a movement of the head portion 4 of the electrical connector 100. The components of the electrical connector 100 according to the embodiments of the present disclosure are integrally connected with each other, the structure is thus simple, and it is possible to easily realize an automatic production. In addition, a length and a contact range of the electrical connector 100 can be easily adjusted.

It should be appreciated by those skilled in this art that the above embodiments are intended to be illustrative, and many modifications may be made to the above embodiments by those skilled in this art. Further, various structures described in various embodiments may be freely combined with each other without conflicting in configuration or principle.

Although the disclosure has been described hereinbefore in detail with reference to the accompanying drawings, it should be appreciated that the disclosed embodiments in the accompanying drawings are intended to illustrate embodiments of the disclosure by way of example, and should not be construed as a limitation to the disclosure.

Although certain embodiments of the general inventive concept of the disclosure have been shown and described, it would be appreciated by those skilled in the art that changes or modification may be made to these embodiments without departing from the principles and spirit of the general inventive concept, the scope of which is defined in claims and their equivalents.

It should be noted that, the word "include" doesn't exclude other elements or steps, and the word "a" or "an" doesn't exclude more than one. In addition, any reference numerals in the claims should not be interpreted as the limitation to the scope of the disclosure.

What is claimed is:

1. An electrical connector, comprising:

a base portion;

a tail portion extending from a first side of the base portion;

a serpentine portion having a first end connected to a second side of the base portion opposite to the first side;

a movable head portion connected to a second end of the serpentine portion; and a housing in which an accommodation chamber is formed to accommodate the serpentine portion, the housing having:

a first end connected with the base portion and a second end provided with a limiting portion confining the serpentine portion within the accommodation chamber, the head portion is movable so as to pass through the limiting portion, the electrical connector is made of a single piece of metal; and a pair of main body portions respectively connected to a third side and a fourth side of the base portion opposite to the third side, the third side and the fourth side are perpendicular to the first side, the accommodation chamber is formed by bending the main body portion at the third side toward the fourth side from the third side and onto an upper surface of the base portion and bending the main body portion located at the fourth side toward the third side from the fourth side and onto a lower surface of the base portion.

2. The electrical connector of claim 1, wherein each of the main body portions has an extension portion at an end of the main body portion away from the tail portion, the extension portion has a first support portion extending perpendicular to the extension portion at a side of the extension portion parallel to the third side.

3. The electrical connector of claim 2, wherein the limiting portion has a limit hole enclosed by each of the extension portions and the first support portion of each of the extension portions.

4. The electrical connector of claim 2, wherein a bending height of each of the first support portions in a thickness direction perpendicular to a moving direction of the movable head portion is greater than a thickness of the movable head portion, and a distance between the first support portions is greater than a width of the movable head portion.

5. The electrical connector of claim 2, wherein the first support portions have different lengths in a length direction parallel to a moving direction of the movable head portion, the first support portions restrict different elastic segments of the serpentine portion at either side of the movable head portion.

6. The electrical connector of claim 2, wherein a first holding portion is provided at a side of each of the extension portions opposite the first support portion, the first holding portion of one of the extension portions has an end portion overlapped on an outer portion of the first support portion of the other of the extension portions.

7. The electrical connector of claim 1, wherein a second support portion, which extends perpendicular to each of the main body portions, is provided at a side of each of the main body portions parallel to the third side, the accommodation chamber is enclosed by the main body portions and the second support portions.

8. The electrical connector of claim 2, wherein a second support portion, which extends perpendicular to each of the main body portions, is provided at a side of each of the main body portions parallel to the third side, the accommodation chamber is enclosed by the main body portions and the second support portions.

9. The electrical connector of claim 4, wherein a second support portion, which extends perpendicular to each of the main body portions, is provided at a side of each of the main body portions parallel to the third side, the accommodation chamber is enclosed by the main body portions and the second support portions.

10. The electrical connector of claim 5, wherein a second support portion, which extends perpendicular to each of the main body portions, is provided at a side of each of the main body portions parallel to the third side, the accommodation chamber is enclosed by the main body portions and the second support portions.

11. The electrical connector of claim 6, wherein a second support portion, which extends perpendicular to each of the main body portions, is provided at a side of each of the main body portions parallel to the third side, the accommodation chamber is enclosed by the main body portions and the second support portions.

12. The electrical connector of claim 8, wherein a bending height of each of the second support portions in a thickness direction perpendicular to a moving direction of the movable head portion is greater than a thickness of the serpentine portion, and a distance between the second support portions is greater than a width of the serpentine portion.

13. The electrical connector of claim 7, wherein a second holding portion is provided at a side of each of the main body portions opposite to the second support portion, and the second holding portion of one of the main body portions has an end portion overlapped on an outer portion of the second support portion of the other of the main body portions.

14. The electrical connector of claim 8, wherein a second holding portion is provided at a side of each of the main body portions opposite to the second support portion, and the second holding portion of one of the main body portions has an end portion overlapped on an outer portion of the second support portion of the other of the main body portions.

15. The electrical connector of claim 9, wherein a second holding portion is provided at a side of each of the main body portions opposite to the second support portion, and the second holding portion of one of the main body portions has an end portion overlapped on an outer portion of the second support portion of the other of the main body portions.

16. The electrical connector of claim 10, wherein a second holding portion is provided at a side of each of the main body portions opposite to the second support portion, and the second holding portion of one of the main body portions has an end portion overlapped on an outer portion of the second support portion of the other of the main body portions.

17. The electrical connector of claim 11, wherein a second holding portion is provided at a side of each of the main body portions opposite to the second support portion, and the second holding portion of one of the main body portions has an end portion overlapped on an outer portion of the second support portion of the other of the main body portions.

18. The electrical connector of claim 1, wherein the electrical connector is a POGO-pin type connector.

19. An electrical connector, comprising:

a base portion;

a tail portion extending from a first side of the base portion;

a serpentine portion having a first end connected to a second side of the base portion opposite to the first side;

a movable head portion connected to a second end of the serpentine portion; and a housing bent on at least one side thereof to form an accommodation chamber accommodating the serpentine portion, the housing having a first end connected with the base portion and a second end provided with a limiting portion confining the serpentine portion within the accommodation chamber, the head portion is movable so as to pass through the limiting portion, the electrical connector is made of a single piece of metal.

20. The electrical connector of claim 19, wherein:

the housing has a pair of main body portions respectively connected to a third side and a fourth side of the base portion opposite to the third side; and the accommodation chamber is formed by bending the main body portion at the third side toward the fourth side from the third side, and bending the main body portion at the fourth side toward the third side from the fourth side.

* * * * *